O. BITTER.
METHOD OF PRESERVING BREAD.
APPLICATION FILED JAN. 25, 1913.

1,081,945.

Patented Dec. 23, 1913.

UNITED STATES PATENT OFFICE.

OTTO BITTER, OF ROCHESTER, NEW YORK.

METHOD OF PRESERVING BREAD.

1,081,945.  Specification of Letters Patent.  Patented Dec. 23, 1913.

Application filed January 25, 1913. Serial No. 744,106.

*To all whom it may concern:*

Be it known that I, OTTO BITTER, of Rochester, in the county of Monroe and State of New York, have invented a new and useful Method of Preserving Bread, which is fully set forth in the following specification and shown in the accompanying drawings.

The present invention relates to a method of preserving bread.

At the present time it is customary to take fresh bread in a hot state and wrap the same in a waxed paper for the purpose of maintaining such bread fresh and in a sanitary condition. Bread so wrapped will, in a short time, say about thirty six hours, begin to mold, making it unfit for use as a food.

An object of this invention is to prevent this molding action, while, at the same time, excluding air to such an extent that the bread does not become stale, being held in a moist condition for many days.

To these and other ends the invention consists in certain parts and combinations of parts all of which will be hereinafter described, the novel features being pointed out in the appended claims.

Figure 1:
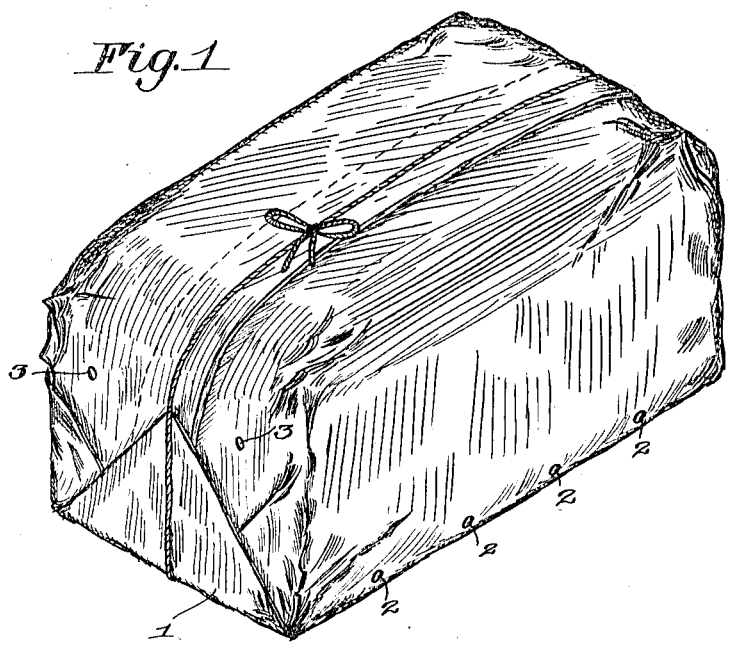
Figure 2:
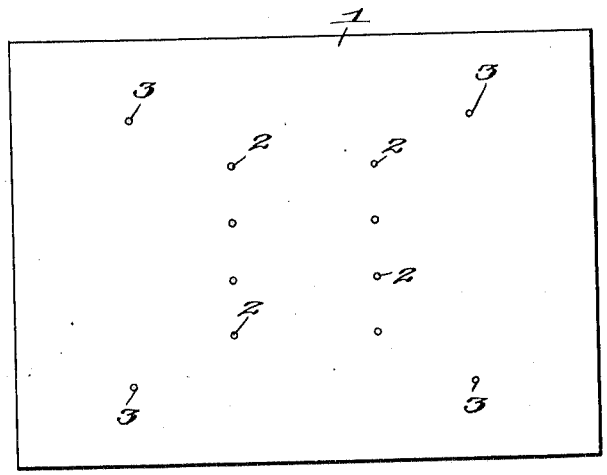

In the drawings: Figure 1 is a perspective view of a loaf of bread treated by this method; and Fig. 2 is a plan view of a wrapper employed in such method.

In carrying out this invention, the bread is taken shortly after it is removed from the oven and while in a hot state, and inclosed within a wrapper, the construction of which is such that it excludes air from the bread to such an extent that the action which produces staleness is prevented or retarded to a very great extent while, at the same time, air is admitted to a slight degree and in such a way that the molding action cannot take place. This molding is, I believe, due to the fact that the bread has been inclosed in a substantially impervious sheet of material while in a hot state and the admission of air in small quantities tends to cool the loaf gradually and permit the escape of those gases which produce the mold.

The wrapper which I prefer to employ in connection with this method and which is of itself of novel construction comprises a waxed or paraffined sheet 1 provided with two series of perforations 2 which are so located on the sheet that, when the bread is wrapped as in the usual manner, these perforations will lie at the bottom of the bread. The sheet is further provided, preferably, on opposite sides of the perforations 2, with perforations 3 which are so located that when the bread is wrapped they will lie near the top of the bread and preferably at the ends thereof as shown in Fig. 1. With this arrangement of wrapper, the air is permitted to circulate through the bread to such a degree that all molding is prevented while, at the same time, owing to the impervious condition of the paper and to the smallness of the holes, air is excluded from the bread to such an extent that the action which produces staleness is very greatly retarded and the bread is kept in a moist and fresh condition for many days.

What I claim as my invention and desire to secure by Letters Patent is:

1. The method of preserving bread against staleness which consists of inclosing the bread, while in a hot state, within a covering of impervious material, and admitting air in such quantities through the covering that the molding action is prevented and the action which produces staleness is retarded.

2. The method of preserving bread which consists of inclosing the same in a sheet of paper coated with wax or paraffin and provided with a few small openings so distributed that air is admitted in such quantities that a molding action is prevented while, at the same time, the action which produces staleness is retarded.

OTTO BITTER.

Witnesses:
H. H. SIMMS,
ADA M. WHITMORE.